(No Model.)
T. J. BANKS.
APPARATUS FOR SPRAYING POTATO VINES.
No. 536,909.   Patented Apr. 2, 1895.
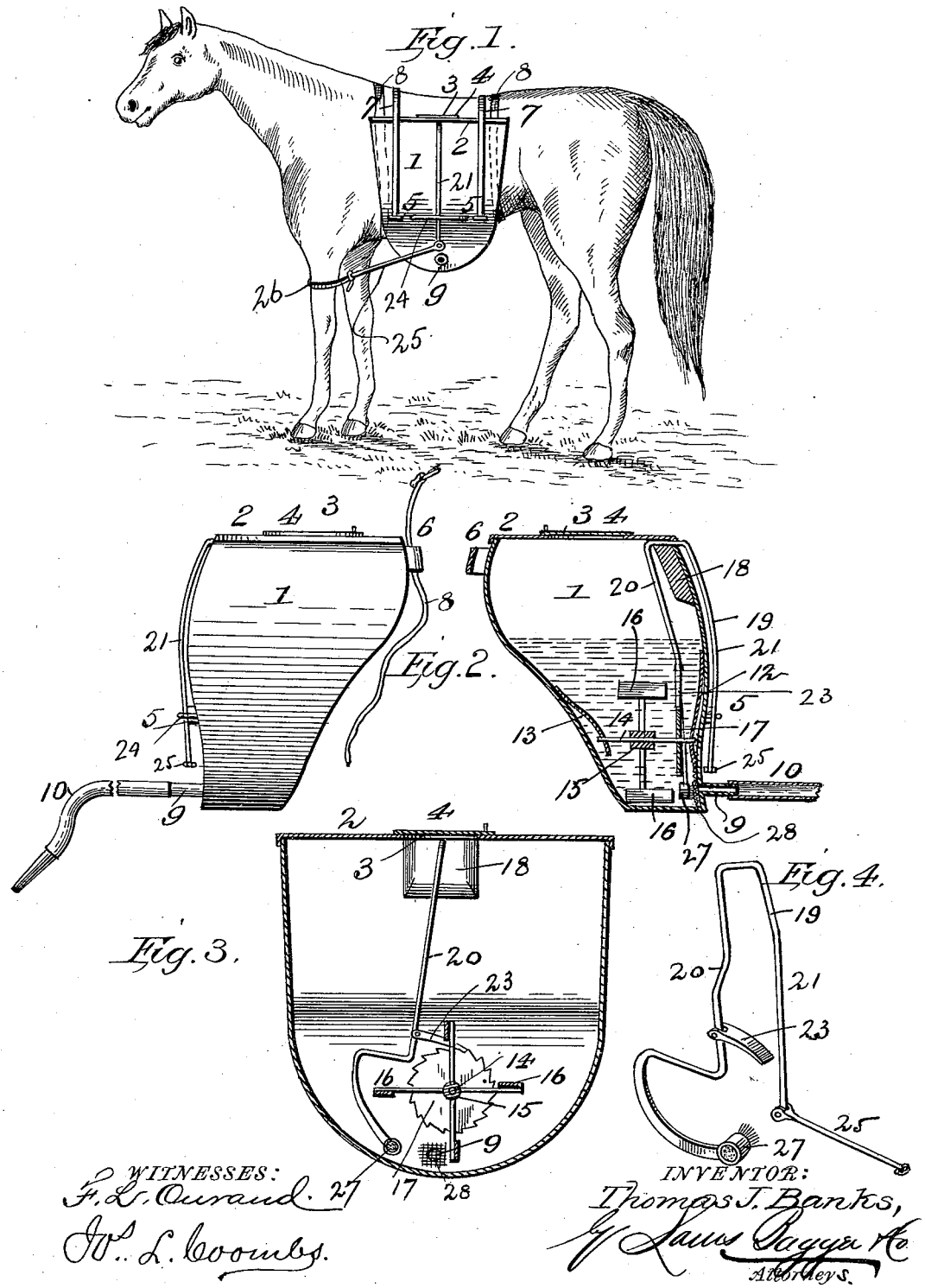

UNITED STATES PATENT OFFICE.

THOMAS J. BANKS, OF LAKEVIEW, MICHIGAN.

APPARATUS FOR SPRAYING POTATO-VINES.

SPECIFICATION forming part of Letters Patent No. 536,909, dated April 2, 1895.

Application filed October 29, 1894. Serial No. 527,297. (No model.)

*To all whom it may concern:*

Be it known that I, THOMAS J. BANKS, a citizen of the United States, and a resident of Lakeview, in the county of Montcalm and State of Michigan, have invented certain new and useful Improvements in Apparatus for Spraying Potato-Vines; and I do hereby declare that the following is a full, clear, and exact description of the invention, which will enable others skilled in the art to which it appertains to make and use the same, reference being had to the accompanying drawings, which form a part of this specification.

My invention relates to improvements in apparatus for spraying potato vines with bug poison, and it consists essentially of two tanks, connected together by straps, one of which is adapted to be suspended on each side of a horse or other four footed animal, means being provided for agitating the liquid in the tanks, and pipes provided for the outlet of the liquid, as will be hereinafter fully described and claimed.

In the accompanying drawings, Figure 1 is a side view of a horse with my device applied. Fig. 2 is a view showing one of the tanks in end elevation and the other in transverse section. Fig. 3 is a longitudinal section of one of the tanks. Fig. 4 is a detail perspective view of the two armed lever.

In the said drawings the reference numeral 1 designates two tanks, preferably made of sheet metal, and having their inner sides concaved or curved to conform to the back and sides of the horse.

The numeral 2 designates the top having an inlet opening 3, therein, and a pivotal cover 4. The tanks are also provided with loops 5 and 6 with which engage straps 7 and 8, by which the tanks are connected together and supported in place on the horse. At the lower end on the outer side each tank is provided with an outlet pipe 9, adapted to receive a hose 10.

Located in the interior of each tank are two brackets 12 and 13, in which is journaled a shaft 14, provided with a hub 15, having paddles 16. This shaft at one end is also provided with a ratchet wheel 17. It will be noted that one of the brackets 13 is secured at its upper end to the side of the tank, while its other end is free and projects inwardly. This bracket is made of spring metal, and by its resiliency it holds the shaft in place. To remove the shaft it is only necessary to push the lower end of the bracket outwardly, when the shaft will be disengaged therefrom. Journaled in a block 18 secured to one of the sides of the tank, is a lever 19 consisting of a metal rod bent over at or near the center forming two downwardly extending arms 20 and 21. The lower end of arm 20 is curved and extends under the ratchet wheel 17, where it is provided with a brush 27. It is also provided with a gravity-pawl 23, which is adapted to engage with the ratchet wheel as said arm is oscillated or vibrated. The other arm 21 extends down outside the tank passing through a guide 24, and at its lower end has pivoted thereto a forwardly extending rod 25 provided with a strap 26 adapted to pass around and be secured to the fore leg of the horse or other animal which carries the tanks. A screen 28 of wire gauze covers the outlet pipe 9.

The operation will be readily understood. The two tanks are identical in construction, and are connected together and supported upon the horse or other animal, by means of the straps connected with the loops, in such manner that one of said tanks will be suspended on each side of the horse. The said tanks having been supplied with the requisite quantity of liquid poison, the animal is driven between the rows of potato vines, and an operator on each side of the horse, by means of the hose connected with the outlet pipes, sprays the liquid upon the vines. As the animal moves forward the rods 25, connected with the forelegs thereof, are drawn alternately forward at each step of the animal vibrating the levers 19, and by means of the pawl 23 rotating the paddles and agitating and stirring the liquid and preventing sediment being deposited in the bottoms of the tanks. The brush on the curved end of arm 20 is also moved back and forth over the screen, preventing clogging of the same.

Having thus fully described my invention, what I claim is—

1. The combination with the tank having an outlet pipe, of the transverse shaft provided with paddles and with a ratchet wheel, the two armed lever, one of which arms is provided with a pawl which engages with said ratchet wheel, the rod pivoted to the other arm, and the strap secured to said rod, substantially as described.

2. The combination with the tank having an outlet pipe, of the bracket 12 secured to said tank, the bracket 13, secured at one end to the opposite side of said tank and having its opposite end free, the transverse shaft journaled in said brackets, provided with paddles and with a ratchet wheel, the two armed lever, one of which arms is provided with a pawl which engages with said ratchet wheel, the rod pivoted to the other arm and the strap secured to said rod, substantially as described.

3. The combination with the tank, having a concave side and an outlet pipe, of the paddle wheel located in said tank having a ratchet wheel, the two armed lever one of which arms is provided with a brush and a pawl which engages with said ratchet wheel, the rod pivoted to the other arm, and the strap secured to said rod, substantially as described.

In testimony that I claim the foregoing as my own I have hereunto affixed my signature in presence of two witnesses.

THOMAS J. BANKS.

Witnesses:
CARY W. VINING,
GUSTAVE OTTO.